Nov. 20, 1923.

P. O. ROWLANDS 1,474,643

MOTOR VEHICLE OR OTHER POWER TRANSMISSION MECHANISM

Filed Sept. 11. 1922    2 Sheets-Sheet 1

Inventor
Percy Octavius Rowlands,
by
Att'ys

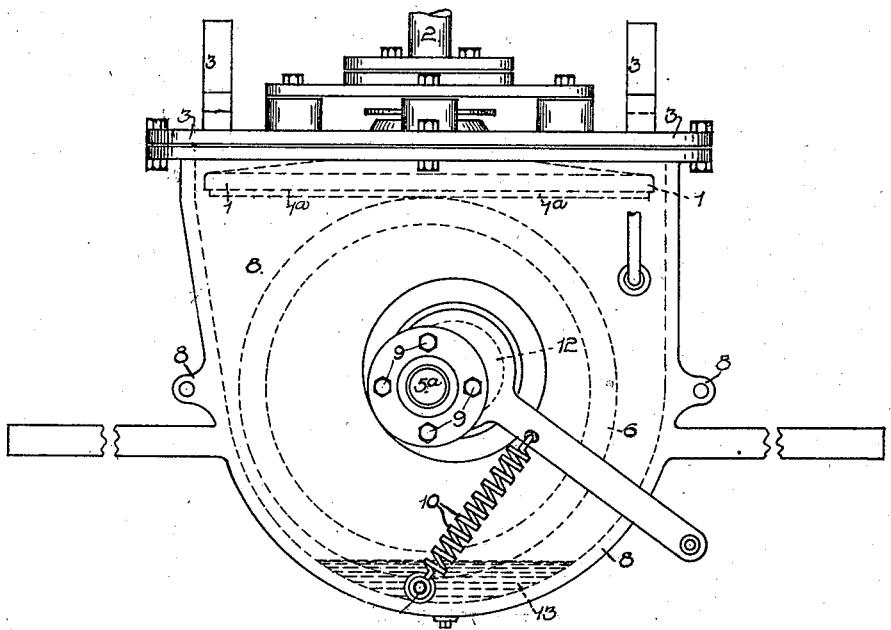

Patented Nov. 20, 1923.

1,474,643

UNITED STATES PATENT OFFICE.

PERCY OCTAVIUS ROWLANDS, OF LIVERPOOL, ENGLAND.

MOTOR VEHICLE OR OTHER POWER-TRANSMISSION MECHANISM.

Application filed September 11, 1922. Serial No. 587,569.

*To all whom it may concern:*

Be it known that I, PERCY OCTAVIUS ROWLANDS, a subject of the King of England, residing at 27 Abercromby Square, Liverpool, in the county of Lancaster, England, have invented new and useful Improvements in and Connected with Motor Vehicle or Other Power-Transmission Mechanism, of which the following is a specification.

This invention relates to mechanism whereby power is transmitted through friction disks or wheels, and the frictional surface of one of which disks or wheels is of india-rubber or its compounds. The invention is particularly applicable to the power transmission mechanism of friction driven motor vehicles, but it may, of course, be applied to other purposes.

According to my invention, I subject the contact surfaces of the disks, whilst in motion, to the action of a fluid, preferably water, and said disks are disposed in a liquid water-retaining chamber or casing.

Other fluids than water may be used for the above purpose, and a splashing effect of water or liquid on the surface may be used.

With regard to the driving and driven disks, the driving disk may be provided with a rubber face suitably secured in a metal disk, the rubber being of the type used in solid tires and the driven disk is preferably of metal.

I will further describe my invention with the aid of the accompanying sheet of explanatory drawings, which illustrates its application—by way of example only—to the driving mechanism of a self-propelled vehicle.

In said drawings:—

Fig. 2 is an elevation viewed at right angles to Fig. 1, and

Figure 1:
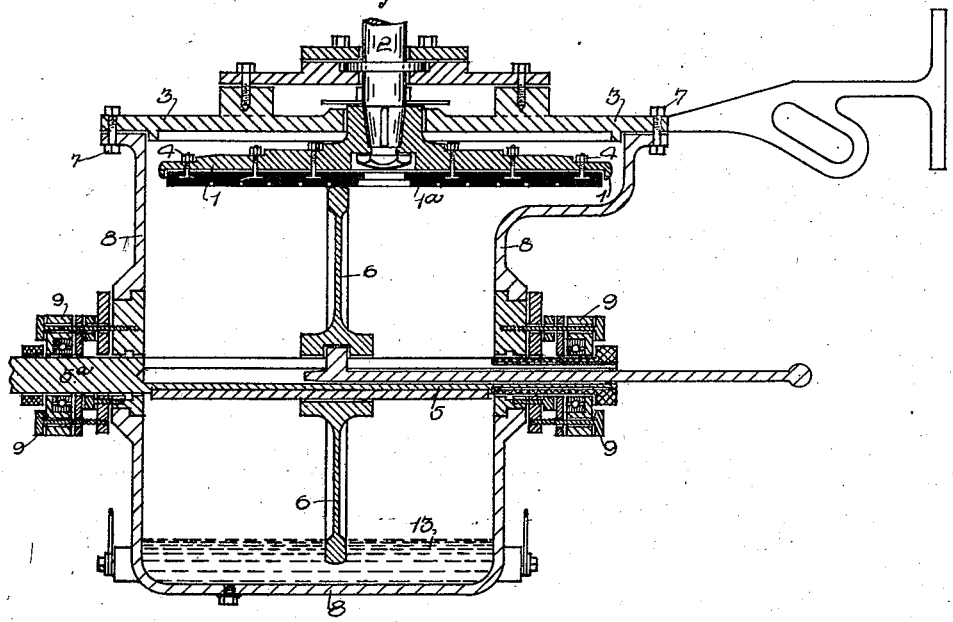
Figure 1 is a longitudinal section of the variable speed power transmission mechanism and a liquid retaining casing.
Figure 3:
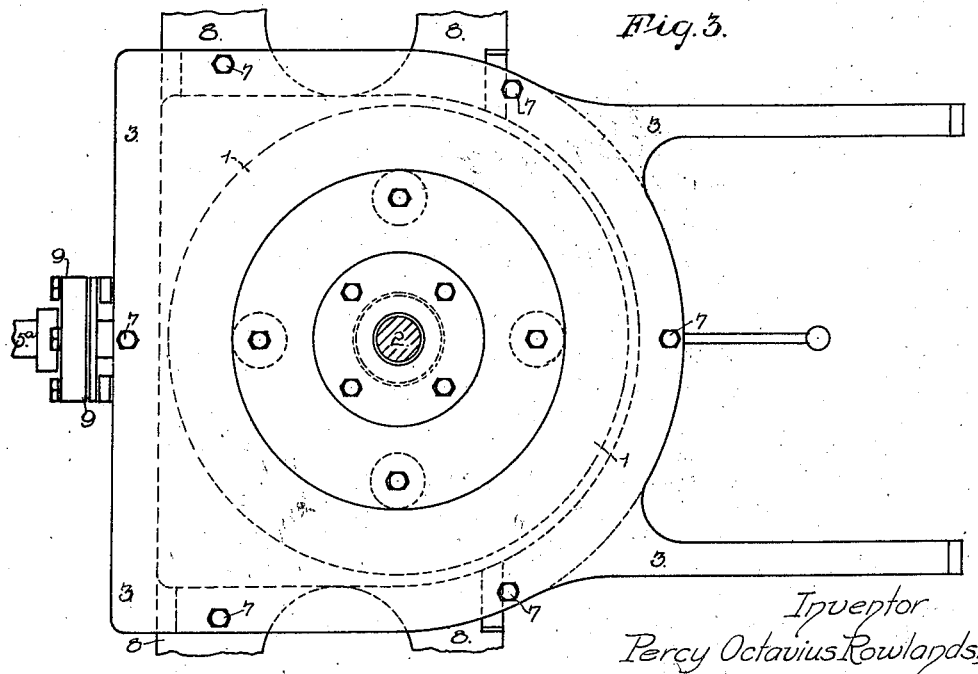
Fig. 3 is a plan.

1 represents a horizontally disposed disk secured to the lower end of an engine crank shaft 2, said shaft 2 extending through a cover 3. To said horizontal disk 1 there is detachably secured by means of bolts 4 a facing or mat 1ª of india-rubber, preferably of the quality commonly used in the manufacture of solid rubber tires, and which may be reinforced with canvas, or the like. Slidably disposed upon a shaft or spindle 5, 5ª (the end 5ª whereof is connected to the Cardan shaft of the vehicle) is a driven disk 6 which may be conveniently constructed of a suitable metal, say an aluminum alloy. Attached by means of the bolts 7 to said cover 3 is a liquid-retaining casing 8 which, together with said cover 3, encloses said driving and driven members 1, 1ª, and 6 of the transmission mechanism. Said casing 8 also supports said shaft 5, 5ª which is carried in eccentrically disposed ball bearings 9, 9.

Said driving disk 1, 1ª, is rotated by means of shaft 2 and, in turn, rotates said driven disk 6 which is forced into contact with it by means of the tension springs 10 acting through levers 11 and eccentric blocks 12.

Said liquid-retaining casing 8 is provided with sufficient liquid 13, preferably water, to enable the driven disk 6 to dip therein, as shown in Figs. 1 and 2, so that the co-acting surfaces of the driving and driven disks are automatically wetted.

My object in subjecting or treating whilst in motion the co-acting frictional surfaces of the disks or wheels, when one of the same is of india-rubber or its compounds, to or with a suitable fluid, preferably water, is to increase the useful life of the rubber and to maintain a substantially constant frictional value between the said co-acting frictional surfaces.

What I claim is:—

1. A power transmission mechanism comprising a casing, a body of liquid in the bottom of said casing, and friction disks rotatable in said casing with one of said disks provided with a surface of india rubber or its compounds, and one of said disks extending into the liquid to carry quantities of the liquid on to the other friction disk.

2. A power transmission mechanism as called for in claim 1, wherein the friction disks are disposed at a right angle to each other with the rubber surfaced disk above the body of liquid.

3. A power transmission mechanism comprising a casing, friction disks rotatable in said casing with one of said disks provided with a surface of india rubber or its compounds and the other disk disposed at a right angle to the rubber surfaced disk, and a body of liquid located in proximity to said disks and adapted to be supplied to said disk to increase the useful life of the rubber surface and maintain a substantially constant frictional value between said disks.

In testimony whereof I affix my signature in the presence of two witnesses.

PERCY OCTAVIUS ROWLANDS.

Witnesses:
JOHN HINDLEY WALKER,
ISOBEL F. V. HINDLEY WALKER.